(12) United States Patent
Ray et al.

(10) Patent No.: US 10,803,102 B1
(45) Date of Patent: Oct. 13, 2020

(54) METHODS AND SYSTEMS FOR COMPARING CUSTOMER RECORDS

(71) Applicant: Walmart Apollo, LLC, Bentonville, AR (US)

(72) Inventors: Andrew Benjamin Ray, Bentonville, AR (US); Nathaniel Philip Troutman, Seattle, WA (US)

(73) Assignee: Walmart Apollo, LLC, Bentonville, AR (US)

( * ) Notice: Subject to any disclaimer, the term of this patent is extended or adjusted under 35 U.S.C. 154(b) by 607 days.

(21) Appl. No.: 14/214,053

(22) Filed: Mar. 14, 2014

Related U.S. Application Data

(63) Continuation-in-part of application No. 13/874,365, filed on Apr. 30, 2013, now abandoned.

(51) Int. Cl.
*G06F 16/33* (2019.01)
*G06F 16/28* (2019.01)

(52) U.S. Cl.
CPC ........ *G06F 16/3334* (2019.01); *G06F 16/288* (2019.01)

(58) Field of Classification Search
CPC .......................... G06F 16/3334; G06F 16/288
USPC .......... 707/691, 748, 749, E17.048, E17.071
See application file for complete search history.

(56) References Cited

U.S. PATENT DOCUMENTS

| 5,390,284 A | 2/1995 | Ogata | |
| 6,295,541 B1* | 9/2001 | Bodnar | G06F 17/30581 |
| 8,621,382 B1* | 12/2013 | Young | G06Q 10/107 |
| | | | 715/700 |
| 9,830,377 B1* | 11/2017 | Ray | G06F 16/9024 |
| 2002/0007284 A1* | 1/2002 | Schurenberg | G06Q 10/10 |
| | | | 705/2 |
| 2002/0073138 A1* | 6/2002 | Gilbert | G06F 17/30 |
| | | | 709/201 |

(Continued)

OTHER PUBLICATIONS

A Hierarchical Bayesian Approach to Record Linkage and Population Size Problems, Andrea Tancredi and Brunero Liseo, The Annuals of Applied Statistics 2011, vol. 5, No. 2B, 1553-1585, DOI: 10.1214/10-AOAS447 © Institute of Mathematical Statistics, 2011 (Year: 2011).*

(Continued)

*Primary Examiner* — Timothy Padot
*Assistant Examiner* — Darlene Garcia-Guerra
(74) *Attorney, Agent, or Firm* — Patterson Thuente Pedersen, P.A.

(57) ABSTRACT

Techniques for comparing customer records to identify linked customer records are provided. The techniques may include a computer system identifying a pair of customer records and comparing the customer records to determine if the customer records are linked records. The computer system may analyze a first set of data values from first corresponding data fields from the pair of records to determine a first distance between the first set of data values, analyze a second set of data values from second corresponding data fields from the pair of records to determine a second distance between the second set of data values, and combine the first distance and the second distance into a combined distance value which is representative of a distance between the pair of customer records by using a combination function which provides a maximum value cap for the first distance and a weight for the first distance.

18 Claims, 11 Drawing Sheets

(56) References Cited

U.S. PATENT DOCUMENTS

| | | | | |
|---|---|---|---|---|
| 2003/0195836 A1* | 10/2003 | Hayes | G06Q 20/102 | 705/37 |
| 2004/0107205 A1* | 6/2004 | Burdick | G06F 17/30303 | |
| 2004/0199880 A1* | 10/2004 | Kresh | G06F 17/5045 | 716/106 |
| 2006/0020611 A1* | 1/2006 | Gilbert | G06F 17/30 | |
| 2006/0080283 A1* | 4/2006 | Shipman | H04L 29/12169 | |
| 2006/0179050 A1* | 8/2006 | Giang | G06F 17/30687 | |
| 2007/0013968 A1* | 1/2007 | Ebaugh | G06Q 10/10 | 358/448 |
| 2009/0089630 A1* | 4/2009 | Goldenberg | G06F 11/0769 | 714/704 |
| 2009/0106245 A1* | 4/2009 | Salcedo | G06F 17/30575 | |
| 2009/0234826 A1* | 9/2009 | Bidlack | G06F 17/30489 | |
| 2009/0271359 A1* | 10/2009 | Bayliss | G06F 17/30303 | 706/54 |
| 2009/0271363 A1* | 10/2009 | Bayliss | G06F 16/285 | |
| 2010/0106724 A1* | 4/2010 | Anderson | G06F 17/30979 | 707/737 |
| 2011/0153327 A1* | 6/2011 | Iasso | G10L 15/08 | 704/243 |
| 2011/0153667 A1* | 6/2011 | Parmenter | G06F 17/30371 | 707/780 |
| 2011/0238488 A1* | 9/2011 | Hahn | G06F 17/30528 | 705/14.42 |
| 2011/0246238 A1* | 10/2011 | Vdovjak | G16H 10/60 | 705/3 |
| 2012/0086544 A1* | 4/2012 | Kemp | G06F 9/5072 | 340/5.1 |
| 2012/0203708 A1* | 8/2012 | Psota | G06Q 30/02 | 705/347 |
| 2012/0226692 A1* | 9/2012 | Kazi | G06F 16/313 | 707/737 |
| 2012/0278263 A1* | 11/2012 | Borthwick | G06N 7/005 | 706/12 |
| 2013/0124474 A1* | 5/2013 | Anderson | G06F 17/30286 | 707/634 |
| 2013/0151537 A1* | 6/2013 | Woody | G06F 17/30572 | 707/748 |
| 2013/0173560 A1* | 7/2013 | McNeill | G06F 16/215 | 707/692 |
| 2013/0212103 A1* | 8/2013 | Cao | G06F 16/215 | 707/737 |
| 2014/0279739 A1* | 9/2014 | Elkington | G06N 99/005 | 706/12 |
| 2014/0279947 A1* | 9/2014 | Chachra | G06F 17/30371 | 707/691 |
| 2015/0234830 A1* | 8/2015 | Bergman | G06F 17/3053 | 707/749 |

OTHER PUBLICATIONS

Application and Filing Receipt for U.S. Appl. No. 14/213,951, filed Mar. 14, 2014. Inventors: Ray et al.

* cited by examiner

METHODS AND SYSTEMS FOR COMPARING CUSTOMER RECORDS

CROSS-REFERENCE TO RELATED APPLICATION

This application is a continuation-in-part of U.S. application Ser. No. 13/874,365, filed Apr. 30, 2013. That application is incorporated herein by reference for all purposes.

BACKGROUND INFORMATION

Field of the Disclosure

The present invention relates to computerized record processing systems and more particularly to techniques for using capped linear combinations to increase link identification rates in comparing customer records.

Background

Significant computation time may be expended for processing certain types of records or data objects. For example, comparing records such as customer records to link associated records requires comparing a pair of records. Each such comparison is computationally expensive as it requires significant processing time. Additionally, as the number records increases, the number of comparisons that need to be conducted may grow exponentially. Comparing records to identify associated records requires significant computing power and is a slow process.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
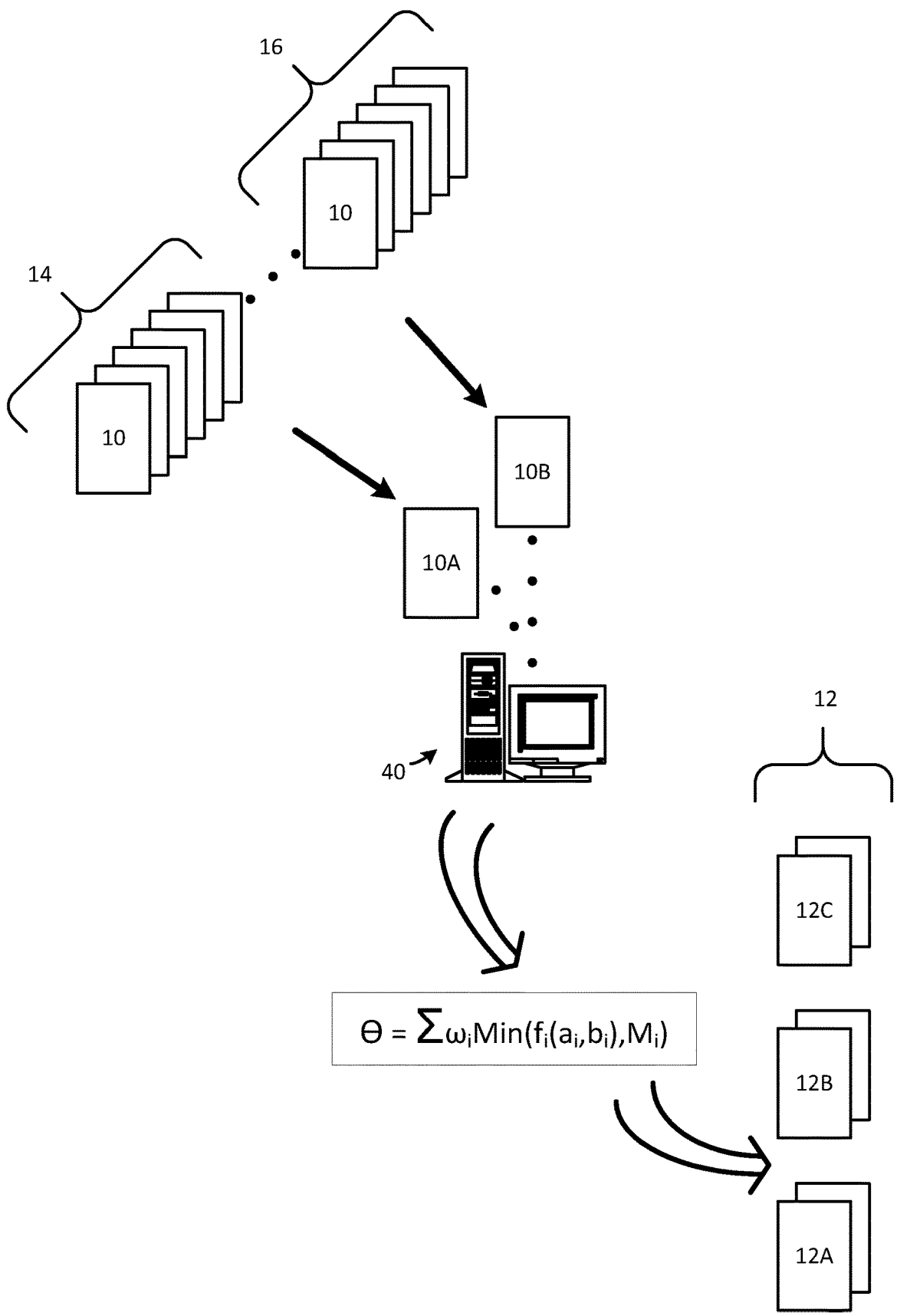
FIG. 1 is a schematic drawing of a computer system used to compare and link customer records.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The disclosure particularly describes how to compare records such as customer records to determine if there are separate records which should be linked as they correspond to the same customer, household, business, etc. Particularly, the present disclosure describes how a computer system may be used to implement capped linear combinations while comparing records to improve the accuracy of the comparison and to increase the identification of linked records.

Referring to FIG. 1, an example computer system 40 may utilize capped linear combinations to increase the rate of identifying linked records 12A, 12B, 12C among customer records 10. In one example, stores may generate many customer records 10. Multiple entry points where customers may provide information and create a customer record 10 as well as customers repeatedly engaging a point of contact with a store may result in multiple instances, types, origins, or groups 14, 16 of customer records and may create many instances where multiple records 10 belong to the same customer, household, business, etc. A customer may create a customer profile or record while shopping at a retail location, and then may also create a customer profile or record while shopping online at the same store. A customer may likewise create a customer record while shopping at a store and may later create a duplicate customer record with the store. A computer system 40 may be used to compare the customer records 10 and identify links between records. The computer system may analyze records to identify and link records 12A, 12B, 12C which belong to the same customer, household, business, etc.

Identifying linked customer records allows the computer system 40 to create a more complete understanding of customer preferences, history, etc. This allows the computer system to tailor promotions or communications to better match the customer preferences and allows a store to better serve the customers.

A capped linear combination model may be used while comparing pairs of customer records to determine if the records should be identified as linked records. The capped linear combination model allows a user to combine analysis of multiple data values into an output indicative of the similarity of the customer records while allowing the user to individually weight and cap the contributions made to the result by individual data values. The capped linear combination method allows a user to more accurately account for the similarities and differences in data values by adjusting and limiting their influence on the resulting output. The capped linear combination method also allows a user to more accurately account for differences in different types of data as well as different types of analysis which may be used to evaluate different types of data within a customer record. The capped linear combination analysis may improve the accuracy of the computer system 40 in comparing the customer records.

A brute force comparison of the customer records requires significant computational time and is not always practical. Each record must be compared with every other record to determine if these belong to the same person. A brute force comparison of N records requires N^2 comparisons. Each comparison of a pair of customer records requires comparison of multiple data fields within each record. In some examples, methods may be used to limit the number of customer records which are compared to records which are likely to result in linked records after comparison. In either case, significant computational time is expended in comparing customer records and it is desirable to maximize the effectiveness of the comparisons.

In an initial step of record comparison, a computer system 40 may analyze the customer records 10 using various blocking techniques to limit the number of customer records which are compared. Rather than randomly selecting records 10A, 10B to compare and analyze, the computer system may systematically select records according to blocking rules which provide an increased likelihood of identifying linked records 12. The computer system 40 may apply hierarchical blocking, combination blocking, etc. to the records 10 to identify records for comparison.

Blocking assigns a block key to a customer record 10 based on data attributes of that record. A blocker is a rule or function which assigns a key to the record 10 based on data found within the record which is associated with the customer who created the record 10. For example, a blocker of 'zip code' may be applied to a record 10 to produce block keys corresponding to zip codes data values found in the records, and records with the same zip codes may be grouped and be compared to determine if these records belong to the same customer. This example may eliminate comparison of records which are from different zip codes and which may be less likely to result in a linked record.

The computer system 40 may apply a hierarchy of blockers to the records 10 to maximize the opportunity to identify linked records while still minimizing the comparison of records which are not likely to produce linked records. For example, individual blockers such as 'zip code,' last name,' phone number,' address,' and 'double metaphone of last name' may be applied to the records in combination with other blockers and in a hierarchy which determines their application. Double metaphone is an algorithm which converts a name into a simplified phonetic representation. This application of a hierarchy of blockers to a record may return, for each record 10, multiple block keys which may be single block keys such as (phone number) as well as more complex block keys such as (double metaphone;zip code) or (postal code;last name).

The computer system 40 may then compare records 10A, 10B which contain matched block keys which result from the hierarchical blocking process. Such records 10A, 10B are much more likely to be linked records than records chosen at random. The computer system 40 may perform comparisons of the records 10 using a hierarchy of blockers which allows a user to create complex rules for application of the blockers to the records and limiting the amount of record comparison to those records which are likely to result in a match. In this manner, records are compared using a hierarchy of multiple different blockers and combination of blockers and the likelihood of identifying the linked records 12 is high while the likelihood of not identifying linked records 12 present in the customer records 10 is low.

Computational time is saved by performing a blocking method such as hierarchical blocking which allows for limiting the comparisons to those which are likely to produce linked records. Computational effectiveness in identifying linked records is improved by using a blocking method such as hierarchical blocking which allows for multiple opportunities for a record to be compared with similar records likely to result in a linked record and then performing a capped linear combination analysis of the records to better account for discrepancy between the records.

It will be appreciated that if records are blocked on zip code alone, for example, only records with the same zip code would then be compared to identify linked records. Where the capped linear combination of the records comparison is tailored to soften the effect of a typographical error in a zip code on the record comparison, the capped linear combination would lose effectiveness as a typo in a zip code could altogether prevent a record from being compared. For this reason, a comparison using capped linear combinations may be more effective when applied to records which are identified or grouped using a method such as hierarchical blocking which allows for multiple opportunities for a record to be appropriately grouped for comparison and may thus prevent a typographical error or the like from removing the record from comparison.

For N records, brute force analysis would perform $N^2$ comparisons. Many of the blockers applied to the records will result in less than N/4 associated records. Some blockers may result in N/5, N/10 records, etc. Even if the hierarchical blockers result in multiple blockers being applied to each record, a situation where all records include an average of four blockers each resulting in comparison with N/5 other records still results in approximately one fifth of the number of record comparisons as compared to a brute force method of record comparison. Comparison using capped linear combinations may increase the computational time for comparison, but the overall computational time may still be significantly reduced.

Figure 2:
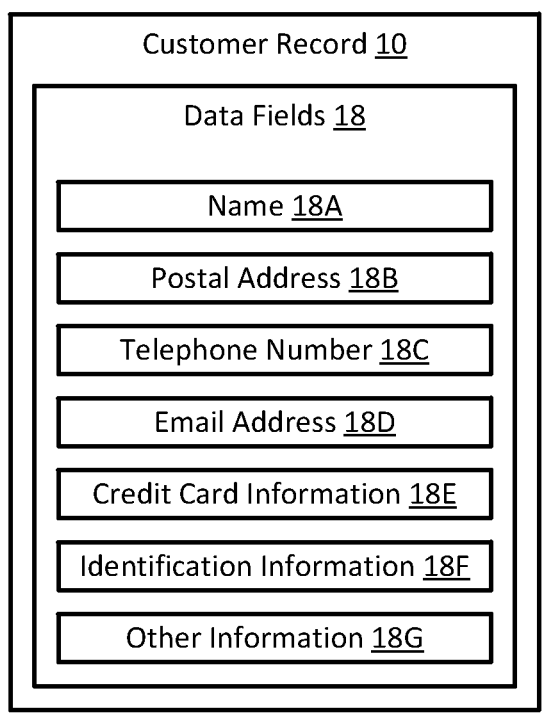
FIG. 2 is a schematic drawing of a customer record.

Referring to FIG. 2, computerized records 10 processed by a computer system 40 may have any suitable form or content. In selected examples, records 10 may correspond to the activities of a business, information related to a business, activities of customers of one or more businesses, information related to customers of one or more businesses, or the like or a combination or sub-combination thereof. For example, records 10 may correspond to or comprise customer profiles. The customer profiles may be associated with a particular business.

A computerized record 10 may include or contain one or more data fields 18. The nature of the data fields 18 may correspond to the nature or purpose of a record. For example, a record 10 that is embodied as a store customer record 10 or customer profile may include one or more data fields 18 populated with name, address, postal zip code, telephone number, telephone area code, email, contact information, demographic information, geographic information, psychographic characteristics, buying patterns, creditworthiness, purchase history, preferences, or the like or a combination or sub-combination thereof. Accordingly, in one example, a record 10 may include or contain data fields 18 populated with one or more names 18A, postal addresses 18B, telephone numbers 18C, email addresses 18D, credit card information 18E (e.g., codes, data hash, or index information corresponding to credit card data which may disallow retrieval of the credit card information itself), identification information 18F (e.g., account numbers, customer numbers, membership numbers, or the like), other information 18G as desired or necessary, or the like.

Records 10 may be obtained from customer registration, customer orders or purchases, promotions, etc. It may be desirable to identify one or more links between two or more records 10 to identify linked records 12. This may mean identifying links or sufficient data overlap between records which allows a determination to be made that these records likely belong to the same actual customer, household, business, etc. After identifying that multiple records are linked to the same customer, a store may use combined information from these records to obtain greater information about this customer. This may allow a store to better serve its customers. The store may better identify a customer's purchasing habits and may offer discounts or promotions which are better suited to a particular customer.

Figure 3:
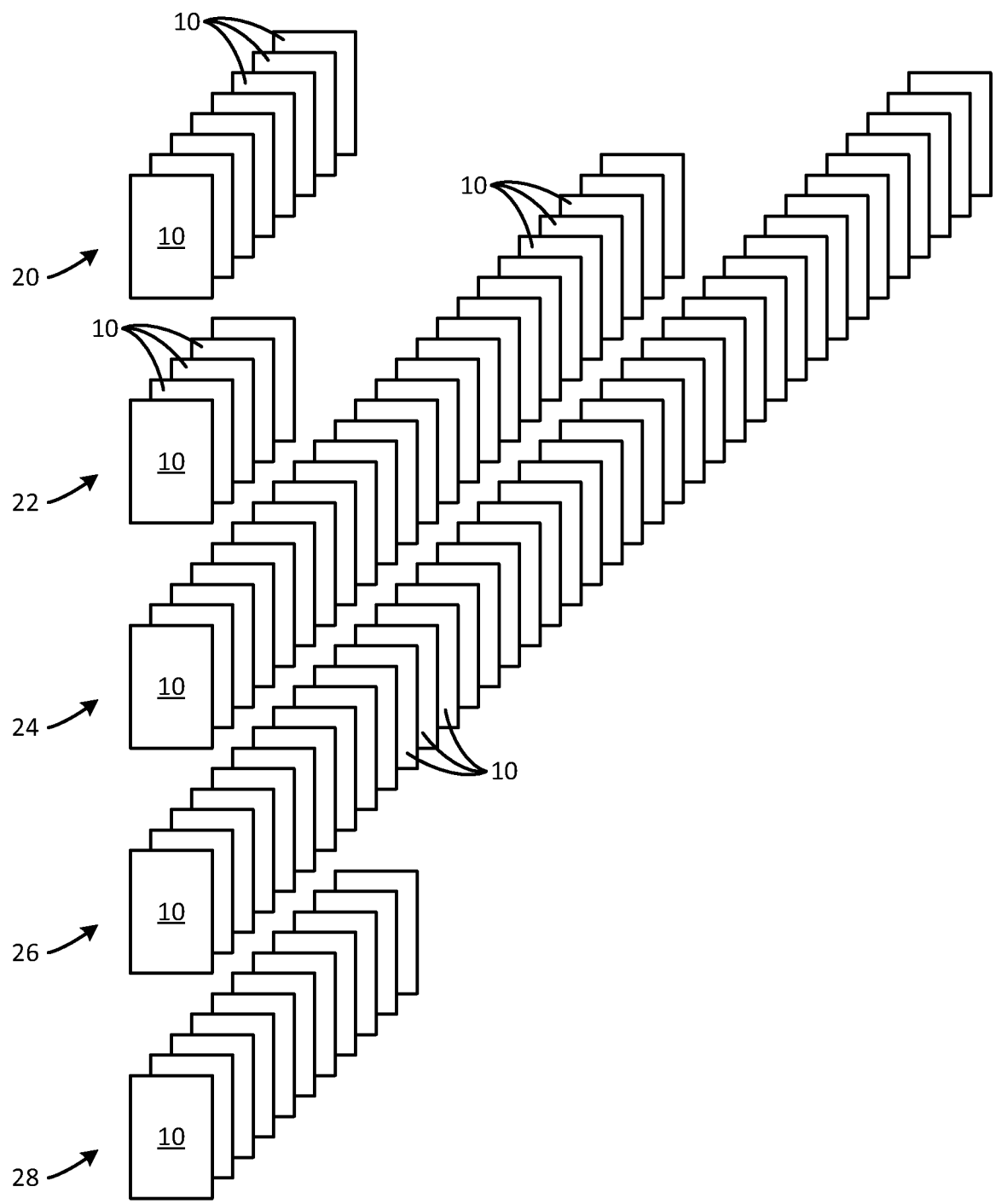
FIG. 3 is a schematic drawing of groups of customer records.

As indicated in FIG. 3, customer records 10 corresponding to customer profiles associated with a single customer may be generated by different sources. Multiple customer records 10 may be related in other ways, such as pertaining to the same household or business. Accordingly, records 10 may be compared to identify those that correspond to the same individual, family, household, business, or the like. Such customer records 10 may then be linked 12, enabling greater benefit to be obtained thereby. Linked records may be generally referred to as pertaining to the same customer entity. In this manner, a customer entity may refer to a customer, a household, a business, etc.

For example, a group 20 of records 10 may correspond to online purchases. A group 22 of records 10 may correspond to online profiles created on a store website. A group 24 of records 10 may correspond to membership in a warehouse club. Still another group 26 of records 10 may correspond to purchases in a brick-and-mortar retail store. Another group 28 of records 10 may correspond to entry into a promotion. Selected customers and/or households may correspond to records 10 from one or more such sources, and may correspond to multiple records within any of such sources. However, there may not be any hard link (e.g., unifying or universal identification number) linking such records 10 together as belonging to a single customer. Moreover, it may be desirable to associate records together within a selection larger than a single customer, such as by linking records which are associated with a single household or business. Accordingly, fuzzy logic may be used to identify those records 10 that correspond to the same individual, household, business, or the like. Once linked together, those linked records 12 may provide a more complete picture of the individual, household, or business and, as a result, be more useful to the store in serving the customer.

Figure 4:
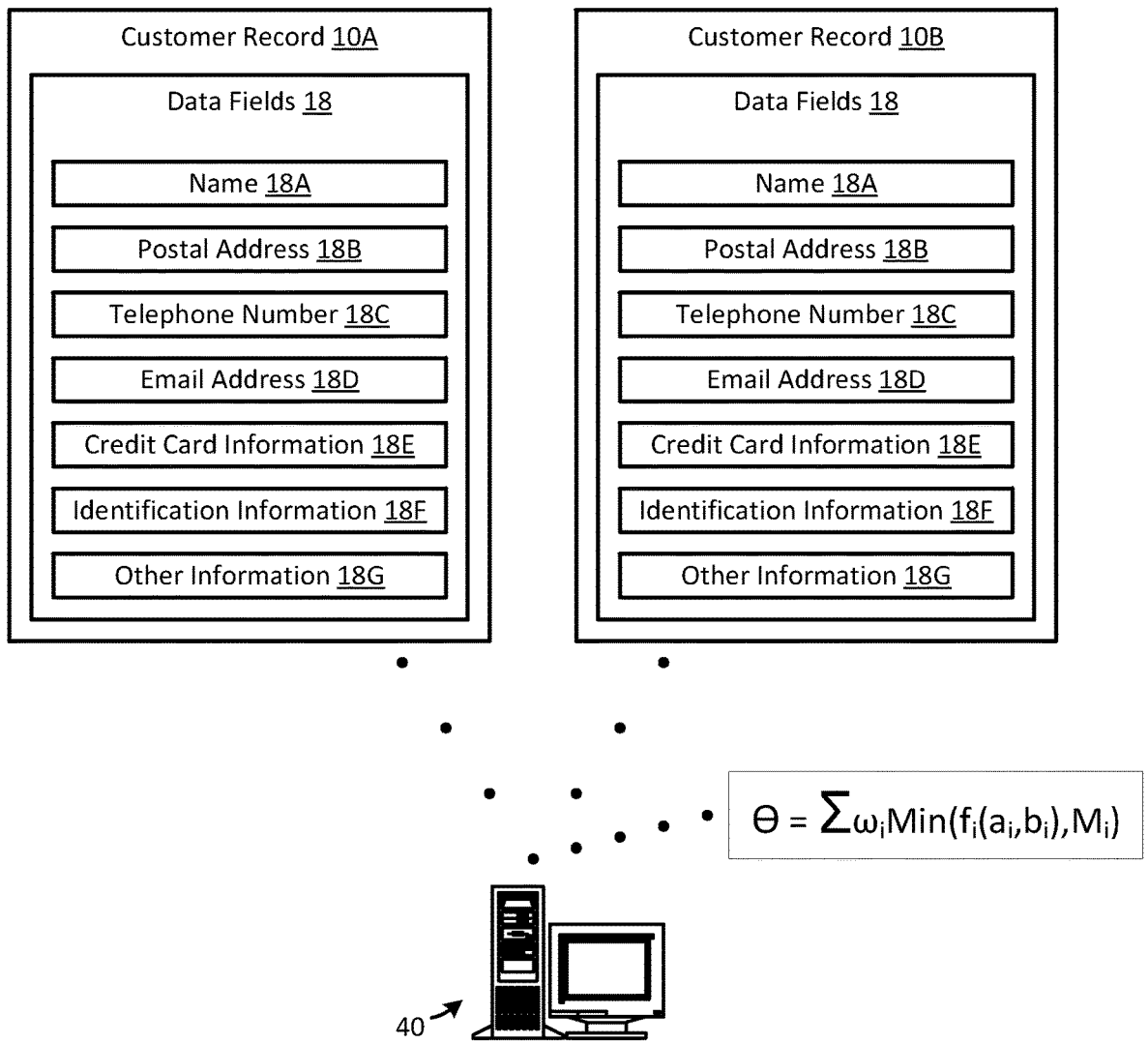
FIG. 4 is a schematic drawing of a computer comparing customer records.
Figure 5:
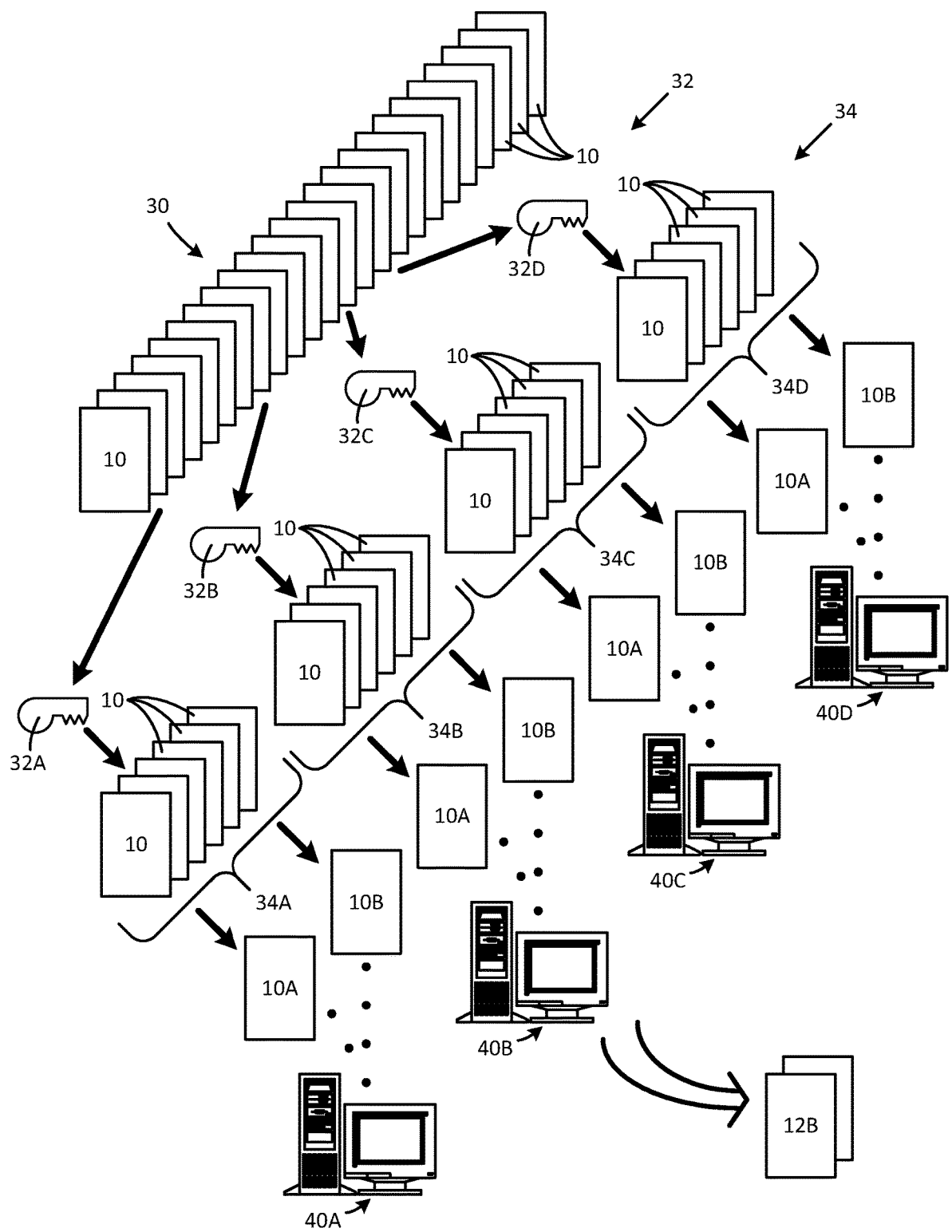
FIG. 5 is a schematic drawing of groups of customer records and a computer system.

Referring to FIG. 4, linking two or more records 10 together may require comparing pairs of records 10A, 10B. As the number records 10 increases, the number of comparisons may grow exponentially. Moreover, each comparison of two records 10A, 10B may be computationally expensive as it may require comparison of one, multiple, or all data fields 18 within the records 10A, 10B. Accordingly, the computer system 40 may employ rules such as hierarchical blocking in order to limit the number of comparisons which are performed and efficiently process one or more large groups of records 10 (e.g., one or more of groups 20, 22, 24, 26, 28). In many examples, it may desirable to compare all available records 10 from all groups 20, 22, 24, 26, 28 to identify linked records 12. The computer 40 may then use capped linear combinations in comparing individual records 10A, 10B to improve the identification of linked records As illustrated in FIG. 5, the computer system 40 may control the number of comparisons which are performed on a target group 30 of records 10 by applying a method such as hierarchical blocking to the records 10 to produce multiple different block keys 32 and separate the group 30 of records 10 into a plurality of smaller block key groups 34 of records 10. Hierarchical blocking may include assigning one or more block keys 32 to each record 10 based on one or more data attributes thereof and responsive to one or more blockers. For example, if each record 10 of a group 30 corresponds to or comprises a customer profile, hierarchical blocking may comprise assigning one or more block keys 32 to each record 10 based on customer attributes such as zip code, telephone, name, first letter of last name, etc. as well as combinations thereof. Comparisons may then only be made between records 10A, 10B corresponding to the same block key group 34, thereby reducing the total number of comparisons that need to be performed and increasing the likelihood that any comparison returns linked records 12.

Hierarchical blocking may increase the likelihood of records 10A, 10B being compared despite typographical errors or the like in a record 10 as it may provide multiple opportunities for a record to be compared. If a record had a typographical error in a block key such as Phone Number or Email Address which may prevent it from being compared with other records likely to be linked records, it may still be compared in other groups of records based on other block keys such as Last Name;Address or Last Name;Street Name; Zip Code. In this manner, an analysis method such as hierarchical blocking which provides for multiple opportunities for a record to be compared against potential linked records combined with a comparison method such as using capped linear combinations which allows for improved accommodation of typographical errors or discrepancies may increase the likelihood that linked records 12 are identified from the records 10.

Since comparisons between records 10 are independent (e.g., can be conducted without inter-process communication), record linkage may be performed in a parallel computing environment. Accordingly, one or more computer systems 40 may compare records 10A, 10B from the block key groups 34. For example, a computer system 40A may compare records 10A, 10B from block key group 34A, resulting in linked records 12B while computer system 40B may compare records 10A, 10B from block key group 34B, resulting in linked records 12B. Moreover, multiple computer systems 40 may be used to accomplish different aspects of comparing the records 10.

For example, one computer system 40 may generate or provide the hierarchical blockers. One or more other computer systems 40 may receive one or more hierarchical blockers and process the group of records 30 according to the hierarchical blockers to produce block keys 32A, 32B, 32C, 32D associated with the records 10 and to generate record groups 34A, 34B, 34C, 34D. One or more other computer systems 40A, 40B, 40C, 40D, may process records 10A, 10B, from the record groups 34A, 34B, 34C, 34D to identify linked records 12. In this manner, multiple computer systems 40 may be used to quickly and efficiently process a large target group 30 of records 10 to identify linked records 12.

When each record 10 is processed, a computer system 40 may generate lists or tuples comprising or identifying one or more block keys 32 identified with a corresponding record 10. Records 10 may then be grouped based on the block keys 32 assigned thereto. Each record may be associated with multiple block keys 32 and may be assigned to multiple block key groups 34 for analysis. A computer system 40 may take the block key groups 34 of records 10 and compare pairs of records from the block key group 34 to identify linked records 12. Hierarchical blocking may apply multiple block keys 32 and combinations of multiple block keys 32 may be used according to the requirements in comparing the records 10. According to the types of linked records 12 which should be identified, a hierarchy of one or more blockers resulting in one or more block keys 32 may be used in comparing the target group 30 of records 10.

As an example, the following individual blockers may be used: Double metaphone of last name, Last name, Zip code, Street Name, City, House Number, Area Code, Phone Number, and Email. One can generate complex blockers in a hierarchical manner by combining multiple individual blockers using various combinatorial methods. Example combinatorial methods include CROSS-PRODUCT, UNION and CHOOSE-K. These blockers may be referred to as combination blockers as they provide different desired combinations of individual blockers.

A CROSS-PRODUCT method of combining individual blockers takes two or more individual blockers and returns the cross product of their block keys. A CROSS-PRODUCT combination emits a block key for each combination of block keys from the given blockers. The blockers are combined together with a delimiter and are used in a consistent order. Thus, if individual blockers A, B, C, and D are used, a CROSS-PRODUCT combination of these four individual blockers would return the CROSS-PRODUCT blocker A;B;C;D. The resulting CROSS-PRODUCT block key would include all four of the individual block keys and the record would be assigned to a record group including other records with the same resulting CROSS-PRODUCT block key for comparison. A CROSS-PRODUCT combination blocker thus creates an AND type analysis where all indicated individual blockers must match for records to be compared.

A UNION method of combining individual blockers (which may be CROSS-PRODUCT or CHOOSE-K blockers) takes two or more blockers and unions their output. That is to say that a UNION block key is emitted for each block key generated by any of the given blockers. Thus, if individual blockers A, B, C, and D are used, a UNION combination of these four individual blockers would return the UNION blocker A, B, C, and D. The UNION blocker results in the four individual block keys A, B, C, and D, and each of the individual block keys A, B, C, and D would assign the record to a record group 34 for comparison with other records within the group having the same block key. UNION blockers are often used in combination with other blockers such as the CROSS-PRODUCT or CHOOSE-K blockers. By way of example, a UNION blocker may be UNION(A, B, CROSS-PRODUCT(B, C, D), CHOOSE-K(B, C, D)). This example UNION blocker would return the following block keys: A, B, B;C;D, B;C, B;D, and C;D. A UNION combination blocker thus creates an OR type analysis where any of the indicated individual blockers must match for records to be compared.

CHOOSE-K (where K is any integer) is created by first creating new CROSS-PRODUCT blockers for each subset of K blockers and then creating the UNION blocker from the resulting CROSS-PRODUCT blockers. Thus, if blockers A, B, C, and D are used, a CHOOSE-2 combination of these individual blockers would return the CHOOSE-2 block keys A;B, A;C, A;D, B;C, B;D, and C;D. A CHOOSE-3 combination of these individual blockers would return the CHOOSE-3 block keys A;B;C and B;C;D. A CHOOSE-K combination blocker thus creates a factor type analysis where any combination of a desired number of indicated individual blockers must match for records to be compared.

Where a record has multiple data values in a data field corresponding to a blocker, multiple block keys would be created for the record and the record may be assigned to multiple groups of records for comparison. For example, a CROSS-PRODUCT blocker of A, B, and C blockers may emit the CROSS-PRODUCT block keys of A1;B;C and A2;B;C where the data field corresponding to A has data values 1 and 2. Such data values may be different phone numbers or zip codes, for example. Inclusion of a record in multiple block key groups 34 increases the likelihood that the record is compared against records likely to be linked records and subsequent comparison using a method such as capped linear combinations may increase the likelihood that linked records 12 are identified despite differences or typographical errors in the records 10.

An example customer record 10 (see FIG. 2) may include the following data fields:

Postal Code: 72712
Postal Code: 94066
Phone Number: 402-555-1234
Name: John Smith Different blockers would individually return different block keys. The following individual blockers may be defined in the computer system: Postal Code, Phone Number, and Last Name. A CHOOSE-K method of combining blockers may be used with the following results: Using the combinatorial blocker rule CHOOSE-2 a computer system would generate block keys for any pair of block keys from different categories. The example customer record above would return the following CHOOSE-2 block keys:

72712;402-555-1234
94066;402-555-1234
72712;Smith
94066;Smith
402-555-1234;Smith This record may then be assigned to 5 different block key groups 34; with each group corresponding to a resultant block key. Thus, the record 10 would be assigned to a '72712;Smith' block key group 34 and would be compared against other records which also produced the '72712; Smith' block key to identify linked customer records 12.

Similarly, application of a CHOOSE-3 blocker to the example customer record 10 would result in the following block keys:

72712;402-555-1234;Smith
94066;402-555-1234;Smith

This example customer record 10 would then be compared to other records which produced the same block keys. An application of a CROSS-PRODUCT blocker of all three individual blockers would also produce the following block keys:

72712;402-555-1234
94066;402-555-1234

This is because all three individual blockers are used for the CROSS-PRODUCE and CHOOSE-3 blockers.

A UNION blocker applied to the example customer record would result in the following block keys:

72712
94066
402-555-1234
Smith

The UNION, CROSS-PRODUCT, and CHOOSE-K blockers allow a person additional control and flexibility in creating blockers for comparison of customer records. The hierarchical use of the UNION, CROSS-PRODUCT, and CHOOSE-K blockers allows even greater control in creating blockers for comparison of customer records. As a further example of hierarchical blockers created from combination blockers, the following individual blockers may be used:

A: Last Name
B: Street Address
C: Street Name
D: City
E: Zip Code
F: Telephone Number
G: Email Address
H: Credit Card Information (i.e. data hash)

The letters A through H are used to identify the various individual blockers in the hierarchical blocker for convenience.

These blockers may be applied to the following example customer record 10 associated with a customer George Smith:

Name: George Smith
Address: 818 East $2^{nd}$ Street, Storeville, Calif. 90222
Telephone number: 910-555-1234
Email Address: George@gmail.com
Credit Card Hash: #E4t%8

A hierarchical blocker may be created to assign block keys 32 to customer records 10 according to the likelihood that a particular block key will result in matched records 12 when applied to customer records 10. Some data fields, such as Telephone Number, Email Address, and Credit Card Information are sufficiently unique that customer records 10 with this information in common are likely to be linked customer records 12. As such, the associated blockers may alone justify comparing records to identify linked records. Some data fields, such as address information, name, etc. are less unique to any given customer and may not along provide sufficient likelihood of finding linked records to justify the computational time to compare records. Blockers associated with these data fields may be linked together using combination blockers in combinations which have been determined to provide sufficient likelihood of resulting in linked records to justify the computational time to compare customer records.

An example hierarchical blocker may be:

UNION(F, G, H, CROSS-PRODUCT(A, B), CROSS-PRODUCT(A, C, D), CROSS-PRODUCT(A, C, E).

This example hierarchical blocker uses the UNION and CROSS-PRODUCT combination blockers and, in a single blocker, returns the following block keys 32 for an analyzed customer record:

A;B
A;C;D
A;C;E
F
G
H where the resulting block keys 32 will have the letters replaced with the data values from the customer record 10. A;B thus represents the block key 'Smith;818 East $2^{nd}$ Street' for the example customer record.

Another example hierarchical blocker might be:

UNION(G, H, CHOOSE-3(A, B, E, F))

This example hierarchical blocker uses the UNION and CHOOSE-K combination blockers and, in a single blocker, returns the following block keys 32 for an analyzed customer record:

A;B;E
A;B;F
A;E;F
B;E;F
G
H where, again, the capital letters are replaced with the data values from the customer record. For the example customer record, the block key A;B;E would be 'Smith;818 East $2^{nd}$ Street;90222'. As noted above, if the customer record has two data values associated with a data field (such as two addresses or zip codes entered in the customer record 10), the blocker may result in two block keys; 'Smith;90210' and 'Smith;90222'. Both of these block keys may be produced and associated with the customer record. A hierarchical blocker may be applied to a target group 30 of customer records 10 and may result in zero or more block keys associated with each customer record 10.

In this manner, hierarchical blockers may be constructed from desired blockers and combination blockers so that the hierarchical blocker creates a number of resultant blockers which are applied to customer records 10 to create block keys 32 from the customer record data fields. In applying the hierarchical blocker, a computer 40 may parse the hierarchical blocker, compare the resultant blockers to a customer record 10, extract data from the data fields identified by the resultant blockers, and create block keys 32 from the extracted data. These various block keys 32 may be concatenated into values such as 'Smith;90222' as discussed and the block keys 32 may be associated with the customer record from which the block keys 32 were extracted.

The computer system 40 may then emit key value pairs of (block key1;block key2; . . . block keyN;customer record) for each customer record producing block keys. The key value pairs/block keys may be used to group customer records 10 by the associated block keys into records groups 34 for analysis. For each group 34, the customer system 40 may compare each possible pair of customer records 10 within the group 34 and identify linked records 12. In comparing pairs of customer records 10, the computer 40 will typically compare all of or a significant portion of the customer record data and use fuzzy logic to identify records 10 which are likely linked customer records 12 associated with a single customer, family, household, business, etc.

Hierarchical blocking may allow for efficient comparison of records 10 and may facilitate the more specific use of these records 10. Where a store has locations throughout a country, hierarchical blocking may allow for easy records linking within a targeted location or may allow for easy records linking without unnecessarily comparing pairs of records which are unlikely to produce linked records as they are from disparate locations, etc. A hierarchical blocker may allow for comparison of records which match a specific predetermined combination of data values which are likely to result in matched records. Comparison of records 10 may be easily performed based on particular needs with significantly reduced computational requirements. Records 10 may be afforded multiple opportunities for comparison with other records 10 to better account for data errors, etc.

Figure 6:
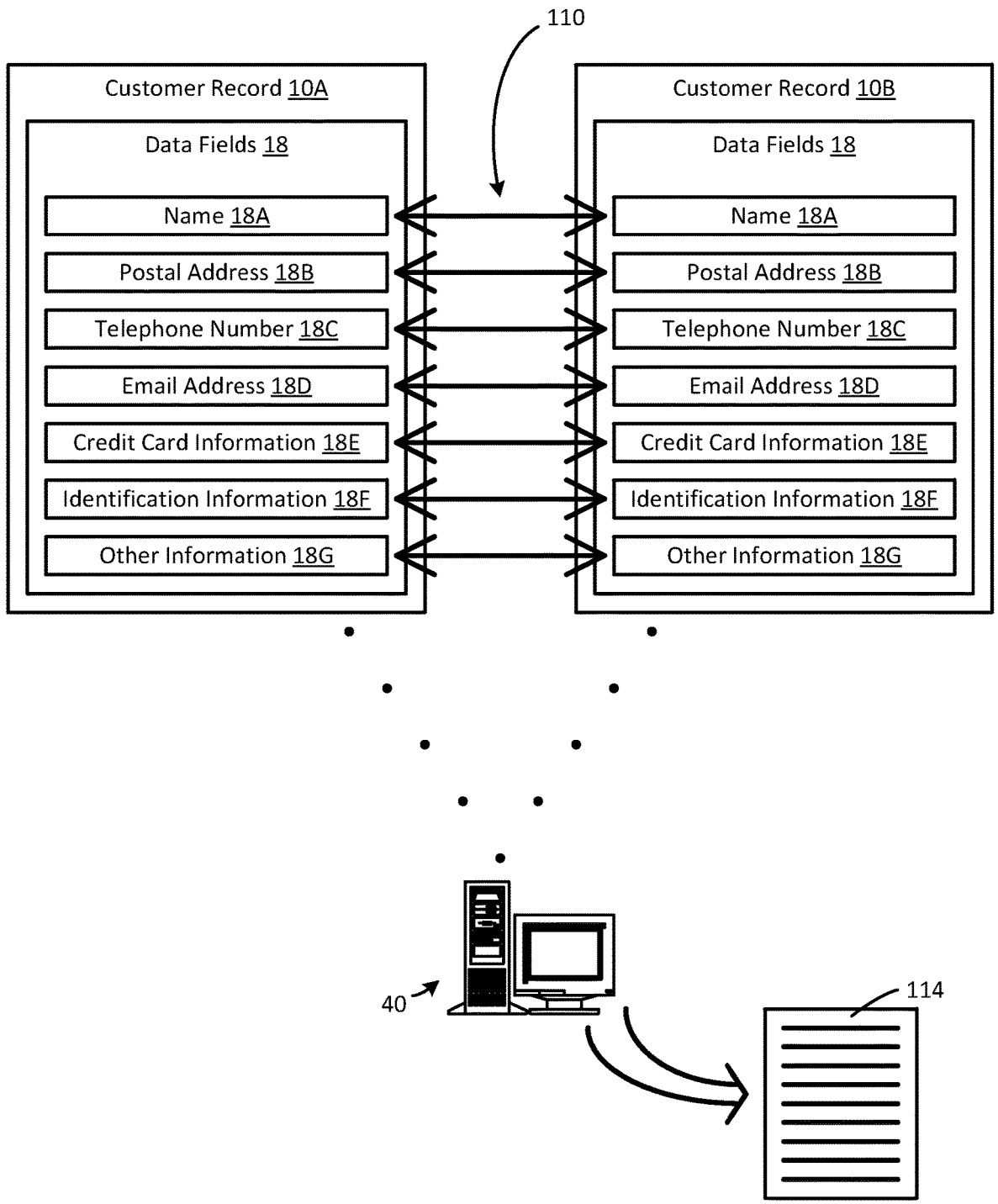
FIG. 6 is a schematic drawing of comparing customer records.

Referring to FIG. 6, a computer system 40 may then compare the records 10A, 10B using a method such as capped linear combinations to determine if the records should be identified as linked records 12. A computer system 40 may compare the records 10A, 10B by comparing individual data fields 18 within each record 10 with a corresponding individual data field 18 within the other record 10. Thus separate comparisons 110 may be performed between some or all of the corresponding individual data fields 18 in the records 10A, 10B. The computer 40 may use different methods for comparing data fields and may frequently generate a distance value representing the distance between the data values in the particular data fields 18.

Different data analysis methods may be used for different data fields. A Levenshtein Distance may be determined for some data fields. A Levenshtein Distance determines the minimum number of edit steps necessary to change one data value (i.e. name address, city, etc.) into another data value. Levenshtein Distance values are integer numbers of zero (for identical data values) and greater. A TriGraham ratio may be determined for some data fields 18. The TriGraham ratio results in a number between 0 and 1 which represents the distance between two data values. For some data fields, a Binary Analysis which assigns a 0 or 1 result depending on whether or not the data values are the same may be used. A Binary Analysis may assign a distance score of 0 if the data values are the same and a 1 if the data values are different. An analysis to identify words in common may also be performed, with a low number such as 0 assigned to compared data values which have many words in common and a higher number such as 1, 5, 10, etc. assigned to compared data values which have few or no significant words in common. Such an analysis may look for substantive words such as nouns or verbs and may ignore non-substantive words such as personal pronouns or words such as and, the, etc. The distance between data values represents the dissimilarity between the data values.

Different distance analysis methods may be used for different data fields 18 according to the type of data field 18. For example, a binary analysis may be appropriate for a data field indicating whether a customer is a male or female. A Levenshtein Distance analysis may be appropriate for a data field indicating the name of a customer. A Levenshtein Distance analysis may be appropriate for data fields where a typographical error may be a concern. An analysis of common words may be appropriate for comparing data in data fields for personal preferences, hobbies, etc. related to a customer. Analysis methods such as these may be used to determine distance metrics for the data fields 18 in customer records 10A, 10B which are being compared. The computer system 40 may thus be programmed to apply different distance analysis methods or rules to the data fields 18 to determine distance scores for the data values in the corresponding data fields 18.

It will be appreciated that the comparison of customer records 10A, 10B often involves the comparison of multiple different corresponding data fields 18. In some examples, all data fields 18 in customer records 10A, 10B may be compared. In other examples, some but not all data fields 18 may be compared and other data fields 18 may be ignored because, while providing useful information about a customer, may not be particularly useful in identifying linked records.

After a computer system 40 performs the desired comparisons 110 of corresponding data fields 18 between customer records 10A, 10B, the computer system may generate distance values 114 for those comparisons 110. The distance values 114 may be saved as a list, etc.

Figure 7:
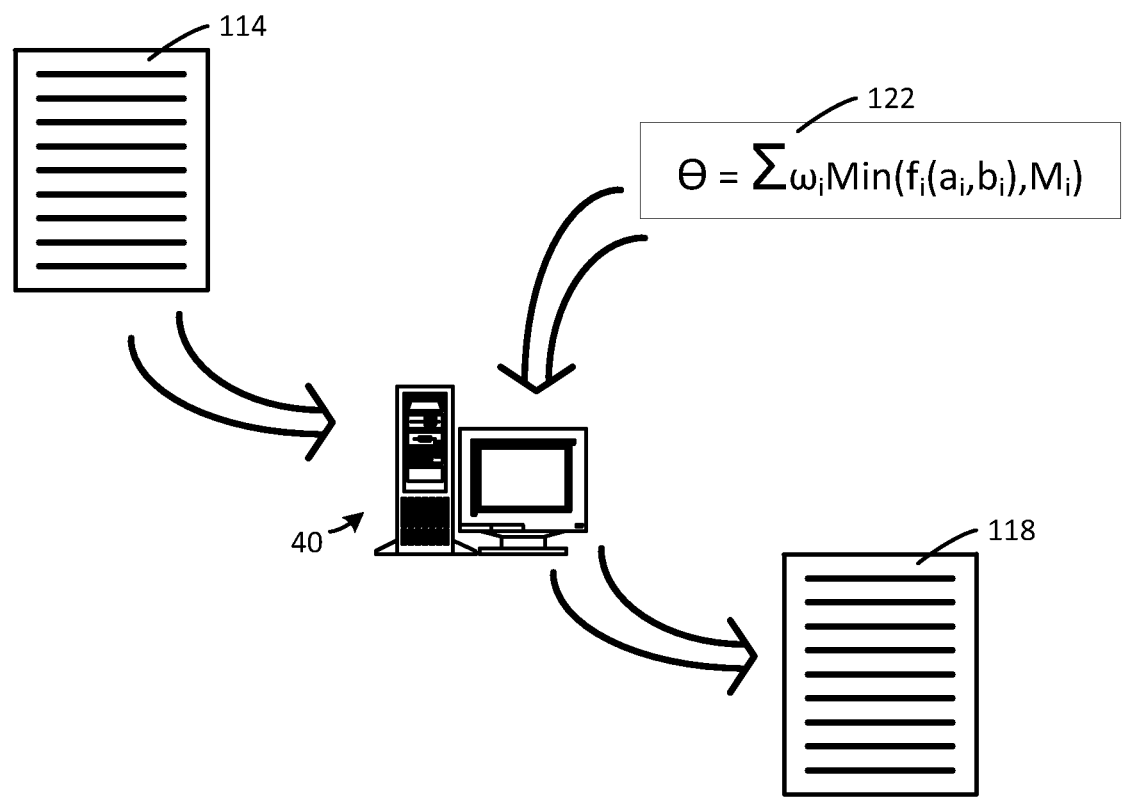
FIG. 7 is a schematic drawing of comparing customer records.

Referring to FIG. 7, the computer system 40 may then combine the individual data field distance values 114 into a combined distance value 118 associated with the customer records 10A, 10B. The computer system 40 may use a capped linear combination 122 to combine the data field distance values 114 into a combined distance value 118. A capped linear combination may take the general mathematical form of:

$$\theta = \Sigma \omega_i \, \text{Min}(f_i(a_i, b_i), M_i)$$

In this example, $\theta$ is the distance between the customer records (and thus the customers represented by the records), $\omega_i$ is the weight for the $i^{th}$ attribute of the customer pair, $f_i$ is the distance function for the $i^{th}$ attribute, and $a_i$ and $b_i$ are the values of the $i^{th}$ attribute for the first and second customer in the pair. Min is a function to return the minimum of the distance function $f_i$ and $M_i$ which is a selected maximum unweighted distance for the distance determined by the distance function $f_i$. Thus, a particular function to determine distance may be assigned to a particular data field 18 containing a particular type of data as well as a maximum value for a determine distance value resulting from the particular distance function and the particular data field/type of data. The weight $\omega_i$ may be a simple coefficient in many examples. Similarly, the maximum unweighted distance $M_i$ may be a fixed value for many examples.

The computer system 40 may determine a distance between two data values and then compare the determined distance value with a predetermined maximum distance value associated with the particular data field which is being compared. If the determined distance value is greater than the maximum distance value assigned for that particular data field and distance function, the maximum distance value is used. If the determined distance value is less than the maximum distance value assigned for that particular data field and distance function, the determined distance value is used. The distance value may then be weighted according to the weighting function $\omega_i$.

This calculation may be performed for the distance value, maximum distance value, and weighting function associated with each data field 18 and the resulting weighted and capped distance values may be added together to determine the combined distance θ between two customer records 10A, 10B. If the combined distance θ between customer records 10A, 10B is less than a predetermined threshold, the customer records 10A, 10B are identified as lined records 12. The computer system 40 (i.e. store, etc.) may then treat the two customer records 10A, 10B as representing the same customer, household, business, etc. and may use combined data from the customer record 10A, 10B to better serve the customer.

In the combined distance θ, every distance component 114 (i.e. compared data field) has a weight of importance and a maximum amount that it can contribute to the final distance value 118. The weights $\omega_i$ and caps $M_i$ may be manually entered into the computer system 40 as values expected to provide good results, but these values may also be determined and/or adjusted from machine learning to adjust the final results for identifying linked customer records 12. Similarly, human checking of the linked customer records 12 may be used to assess the accuracy of the system and adjust system parameters as necessary.

Figure 8:
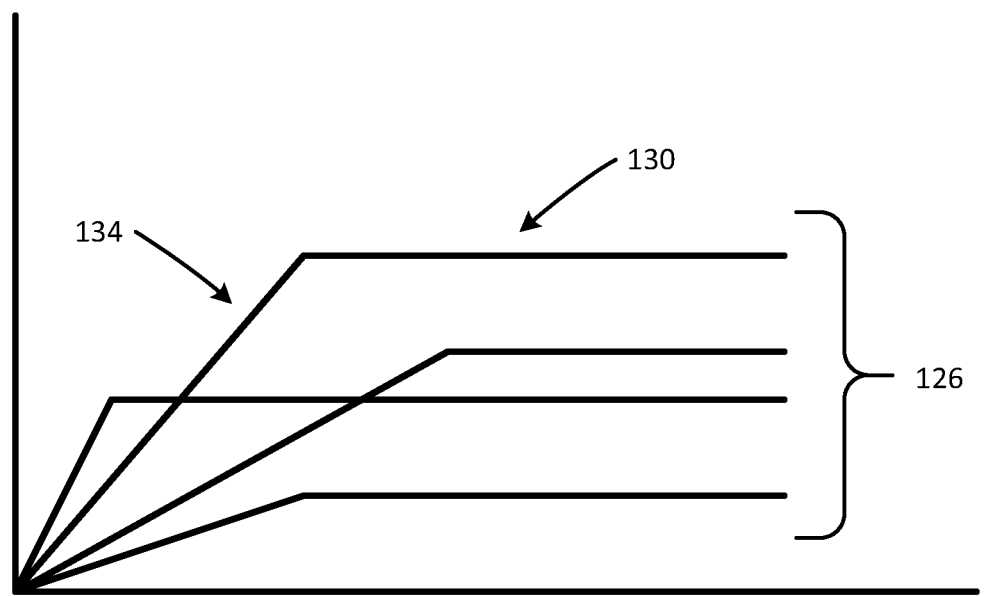
FIG. 8 is a graphical representation of a capped linear combination of individual distance values.

Referring now to FIG. 8, a graphical representation of a number of different capped and weighted distance values 126 that have been determined from individual distance values 114 is shown. In this graph, the Y axis represents the contribution of the weighted distance value 126 to the overall distance value 118 and the X axis represents the individual distance value 114. The weights $\omega_i$ and caps $M_i$ may be tailored to adjust the maximum value 130 of the capped and weighted distance value 126 as well as the slope 134 at which the capped and weighted distance value reaches the maximum 130. The capped linear combination thus allows for improved weighting of individual distance values 114 in creating a combined distance value 118 for a pair of customer records 10A, 10B.

Figure 9:
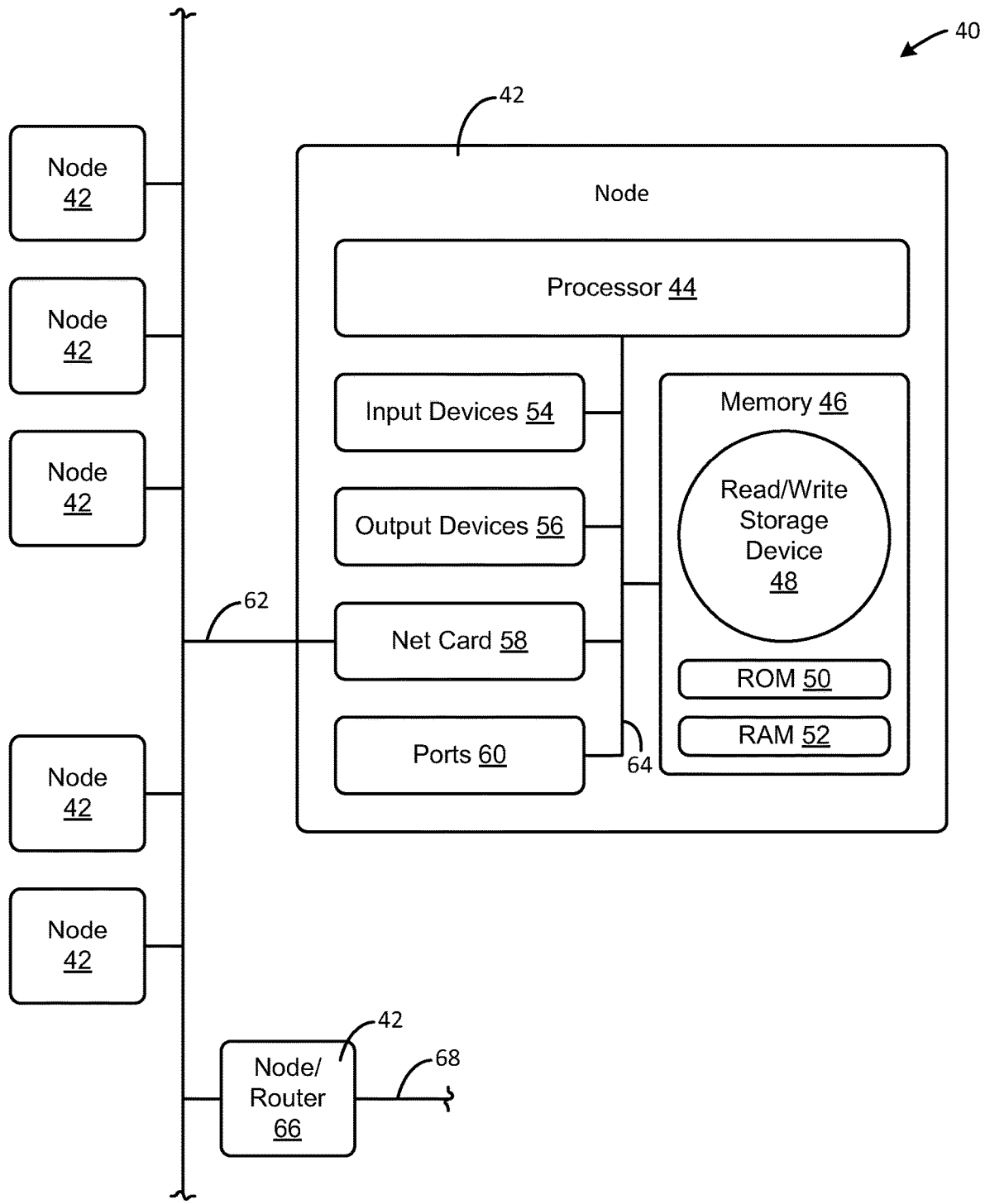
FIG. 9 is a schematic drawing of a computer system.

Referring to FIG. 9, a computer system 40 may provide, enable, or support capped linear combination of distance values or data similarity scores, hierarchical blocking, parallelization, or the like in any suitable manner. A computer system 40 may be embodied as hardware, software, or some combination thereof. In certain examples, a computer system 40 may comprise a single computer. In certain examples, a computer system 40 may comprise multiple processor units or multiple computers. For example, a computer system 40 may include one or more nodes 42.

A node 42 may include one or more processors 44, processor cores 44, or central processing units (CPUs) 44 (hereinafter "processors 44". Each such processor 44 may be viewed an independent computing resource capable of performing a processing workload distributed thereto. Alternatively, the one or more processors 44 of a node 42 may collectively form a single computing resource. Accordingly, individual workloads shares (e.g., group 30, block key group 34, records 10) may be distributed to nodes 42, to multiple processors 44 of nodes 42, or combinations thereof.

In selected examples, a node 42 may include memory 46. Such memory 46 may be operably connected to a processor 44 and include one or more devices such as a hard drive 48 or other non-volatile storage device 48, read-only memory (ROM) 50, random access memory (RAM) 52, or the like or a combination or sub-combination thereof. In selected examples, such components 44, 46, 48, 50, 52 may exist in a single node 42. Alternatively, such components 44, 46, 48, 50, 52 may be distributed across multiple nodes 42.

In selected examples, a node 42 may include one or more input devices 54 such as a keyboard, mouse, touch screen, scanner, memory device, communication line, and the like. A node 42 may also include one or more output devices 56 such as a monitor, output screen, printer, memory device, and the like. A node 42 may include a network card 58, port 60, or the like to facilitate communication through a computer network 62. Internally, one or more busses 64 may operably interconnect various components 44, 46, 54, 56, 58, 60 of a node 42 to provide communication therebetween. In certain embodiments, various nodes 42 of a computer system 40 may contain more or less of the components 44, 46, 54, 56, 58, 60, 64 described hereinabove.

Different nodes 42 within a computer system 40 may perform difference functions. For example, one or more nodes 42 within a system 40 may function as or be master nodes 42. Additionally, one or more nodes 42 within a system 40 may function as or be worker nodes 42. Accordingly, a system 40 may include one or more master nodes 42 distributing work to one or more worker nodes 42. In selected embodiments, a system 40 may also include one or more nodes 42 that function as or are routers 66 and the like. Accordingly, one computer network 62 may be connected to other computer networks 68 via one or more routers 66.

Such a computer system 40 may facilitate capped linear combination of distance scores and like analysis as well as hierarchical blocking and other methods. By way of example, one node 42 may parse a hierarchical blocker to create the resultant blockers from the hierarchy of blockers/combination blockers. One or more nodes 42 may compare groups 30 of customer records 10 to create block keys 32 from the resultant blockers and individual customer records 10. One or more nodes 42 may associate customer records 10 into record groups 34 based on a block key 32 which is common to records 10 assigned to a record group 34. One or more nodes 42 may then compare pairs of records 10 from within a record group 34 to identify linked records 12. Work may thus be efficiently distributed across multiple different computing nodes 42 as the hierarchical blocking facilitates the ability to distribute the workload as desired.

Figure 10:
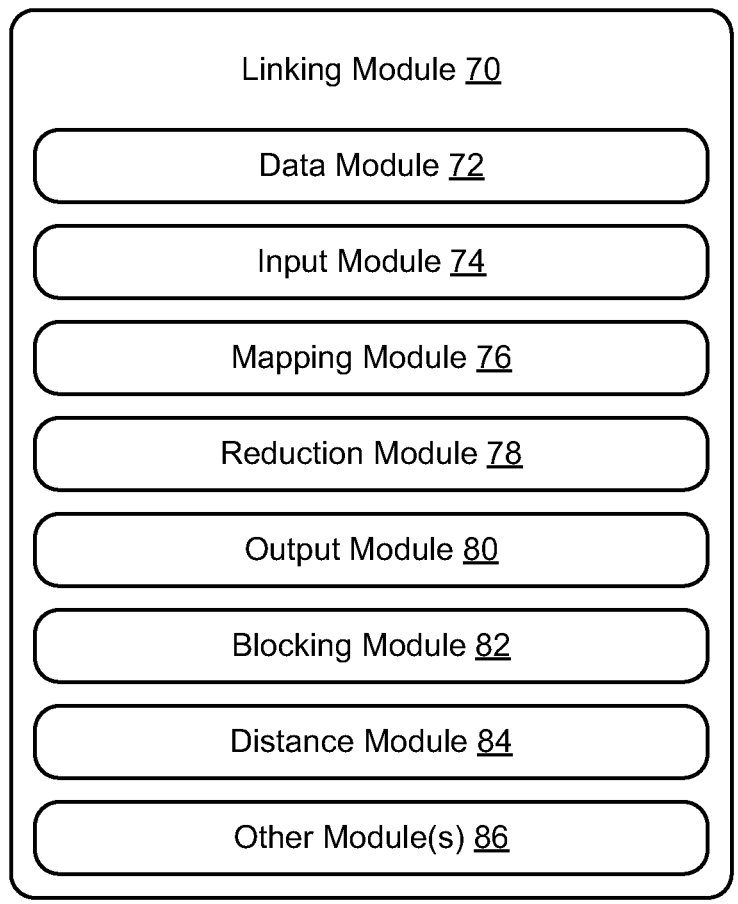
FIG. 10 is an illustration of a linking module.

Referring to FIG. 10, a computer system 40 may process records 10 in any suitable manner. The nature of the hardware and/or software of a computer system 40 may reflect the specific processing to be performed. For example, a computer system 40 configured to compare and link records 10 may include a linking module 70 providing, enabling, or supporting such functionality.

A linking module 70 in accordance with the present invention may include any suitable arrangement of sub-components or modules. In certain embodiments, a linking module 70 may include a data module 72, input module 74, mapping module 76, reduction module 78, output module 80, blocking module 82, distance module 84, one or more other modules 86 as desired or necessary, or the like or some combination or sub-combination thereof.

In selected embodiments, certain components or modules of a linking module 70 may be associated more with nodes 42 of a certain type. For example, a data module 72, input module 74, mapping module 76, reduction module 78, and output module 80 may be primarily or exclusively associated with one or more master nodes 42. Conversely, a blocking module 82 and distance module 84 may be primarily or exclusively associated with one or more worker nodes 42.

A data module 72 may contain information supporting the operation of a linking module 70. In selected embodiments, a data module 72 may contain or store one or more records 10. For example, a data module 72 may contain one or more records 10 comprising customer profiles from one or more sources. A data module 72 may also contain data, information, results, or the like produced by a linking module 70 of one or more components or modules thereof. For example, a data module 72 may contain a list of individual blockers, combination blockers, and hierarchical blockers. A data module may also contain distance functions, distance maximum values, distance weighting functions and the like associated with particular data fields 18 found within customer records 10. A data module 72 may also contain linking information identifying which records 10 correspond to the same individual, household, business or the like.

An input module 74 may generate, collect, extract, receive, communicate, and/or process any inputs (e.g., instructions, information, etc.) needed or used by a linking module 70. For example, an input module 74 may receive a command or instruction to begin processing records 10. Accordingly, in selected embodiments, an input module 74 may be responsible for initiating a linking analysis or process. Alternatively, or in addition thereto, an input module 74 may collect, receive, extract, or communicate one or more records 10 that may be used or processed by one or more other components or modules of a linking module 70. An input module 74 may allow a person to input a desired hierarchical blocker or capped linear combination function, for example.

A mapping module 76 may control the flow of instructions, records 10, blockers, keys, distance functions, weights, maximums, or the like or combinations or sub-combinations thereof from one or more master nodes 42 to one or more worker nodes 42. For example, a mapping module 76 may take an appropriate input, divide it into smaller sub-problems, and distribute them to a plurality of worker nodes 42. In selected embodiments, a mapping module 76 may enable one or more worker nodes 42 to take an input, divide it into smaller sub-problems, and distribute them to still other worker nodes 42, leading to a multi-level tree structure.

Once the various worker nodes 42 have finished processing their respective workloads, the results may be passed back to one or more master nodes 42. This process may be controlled or facilitated by a reduction module 78. Alternatively, or in addition thereto, a reduction module 78 may control the assimilation or reduction of the results produced by one or more worker nodes 42. That is, a reduction module 78 may collect the answers to all the various sub-problems and combine them in some way to form a desired output.

An output module 80 may generate, collect, compile, send, communicate, and/or process any outputs of a linking module 70. For example, in selected embodiments, an output module 80 may receive linking information (e.g., from an reduction module 78), passing linking information to a data module 72 for storage, modify one or more records 10 in accordance with linking information, or the like or a combination or sub-combination thereof.

A blocking module 82 may receive blockers such as combination blockers and hierarchical blockers and may analyze customer records 10 from a group 30 of customer records 10 according to the blockers to produce block keys 32 and associate these keys with the relevant customer record 10 which produces the key. The blocking module 82 may identify records 10 which correspond to the block key 32 and may create groups 34 containing records 10 corresponding to the particular block key 32.

A distance module 84 may receive customer records 10A, 10B from a records group 34 and compare the customer records to determine if the customer records are likely linked records 12. The distance module 84 may receive customer records 10 from a block key group 34 and compare pairs of records 10 from within the block key group 34 to identify linked records 12. The distance module 84 may use distance formulae to determine distance values 114 between data values in individual corresponding data fields 18 and may use capped linear combination to create a combined distance value 118 used to determine if records should be identified as linked records 12. Additionally, the linking module 70 may include one or more other modules 86 as may be necessary or desirable to compare the records 10 and identify linked records 12.

Figure 11:
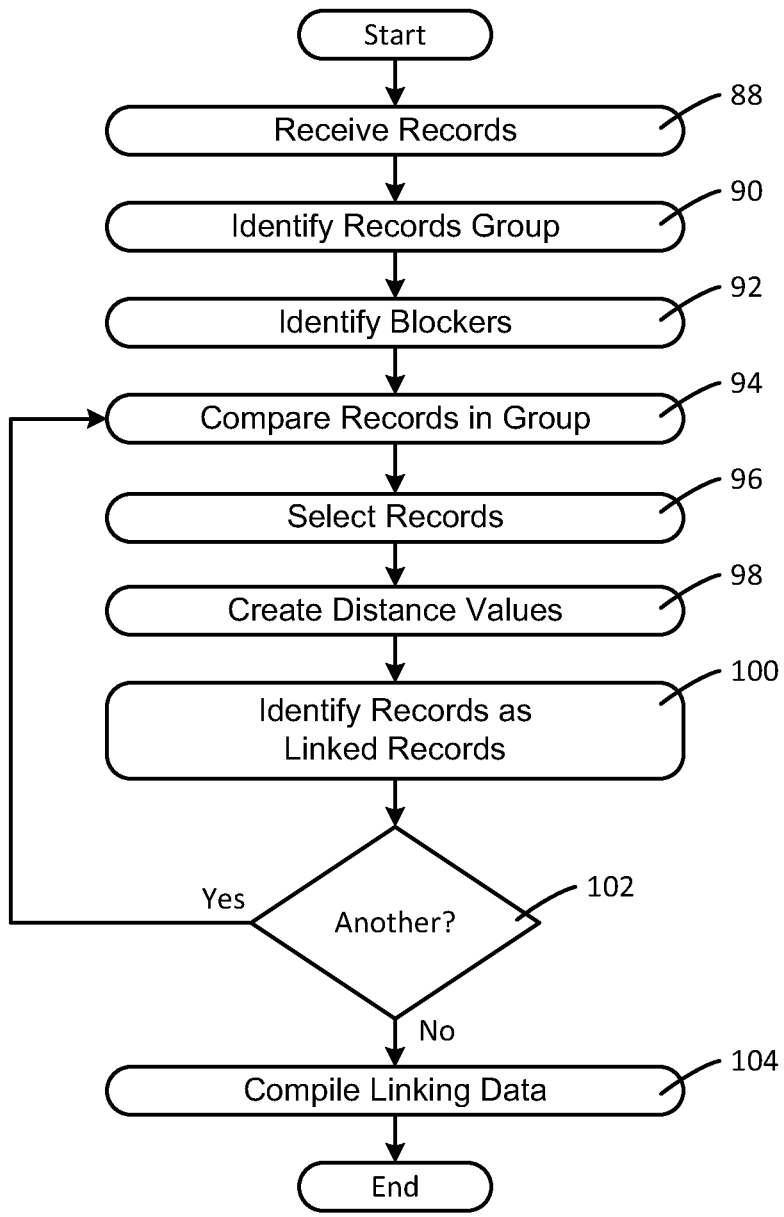
FIG. 11 is a flowchart illustration of comparing customer records.

Referring now to FIG. 11, a flowchart illustrating a computer system 40 comparing customer records 10 is shown. The flowchart in FIG. 8 illustrates the architecture, functionality, and operation of possible implementations of systems, methods, and computer program products according to certain examples. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A computer system 40 may receive 88 or identify customer records 10. These customer records 10 may include one or more groups 20, 22, 24, 26, 28 of customer records 10 which may be obtained from various different sources. It will be appreciated that, in some instances millions of records 10 may be present. The computer system 40 may identify 90 a records group 30 which is to be compared. The records group 30 may include all records 10 from available records groups 20, 22, 24, 26, 28 or may include a smaller subset of records, such as one group 26 according to the purpose in comparing the records 10.

The computer system 40 may receive or identify 92 one or more blockers such as combination blockers or hierarchical blockers. The blockers may be used in comparing the group 30 of records 10 to reduce the computational load and accurately provide linked records 12. The computer system 40 may parse the blockers if necessary to generate resultant blockers. The computer system 40 may then analyze records 10 against the blockers and associate the records 10 with the extracted block keys and associate the records 10 into block key groups 34.

The computer system 40 may then compare 94 records from a block key group 34. In comparing records 10 from the block key group 34, the computer system may select 96 two records 10A, 10B and compare data from data fields 18 within the records to determine if the two records are linked (i.e. pertain to a single customer, household, business, etc.) or are not linked. The computer system may use fuzzy logic or the like to compare the data values 18. In particular, the computer system 40 may create combined distance values 118 from the customer records 10 and may more specifically create individual distance values 114 from corresponding data fields 18 and perform a capped linear combination of the individual distance values 114 to create a combined distance value 118.

If the records 10A, 10B should be linked, the computer system may identify 100 these records as linked records 12 or otherwise compile linking data resulting from the compared records 10. The computer system 40 may then decide 102 if another records, blockers, etc. should be processed, if another group of records 30 should be analyzed, if another pair of records 10A, 10B should be compared, etc. If necessary, the computer system 40 may loop back to a desired step and continue to process a hierarchical blocker, resultant blocker, record group 34, records 10, distance value 114, 118, etc. as desired. The computer system 40 may compile 104 linking information for the records 10. The linking data may then be presented 106 to a user or otherwise analyzed as desired. One or more computer systems 40 may work in parallel or series to process customer records 10 as desired.

The computer system is advantageous as it may allow for accurate identification of lined records without an excessive computational load in comparing pairs of records which are not likely to result in linked records. The computer system does not require any additional hardware or changes to hardware to implement and may be implemented on existing computer devices with only software. A store or institution may benefit from receiving additional information about their customers and may be able to provide improved service and value to their customers.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A method for increasing the accuracy of electronic customer records by identifying linked customer records, wherein linked records comprise two or more electronic customer records that pertain to a single customer entity, the method comprising:

receiving a blocking rule that defines a plurality of block keys for an electronic customer record as a function of data found within the electronic customer record, the blocking rule comprising at least one hierarchical combinatorial function configured to maximize opportunity to identify linked customer records and minimize comparisons of electronic customer records, each of the plurality of block keys being previously associated with a likelihood of identifying the single customer entity according to a relative uniqueness of the data;

identifying, without performing a pairwise comparison of electronic customer records, a target group of electronic customer records, the target group being a subset of the electronic customer records stored in at least one memory in a computing system, each electronic customer record having data fields containing data pertaining to a customer, by:

applying the blocking rule to the data found within each electronic customer record to determine each of the plurality of block keys, arranging the plurality of block keys based on the likelihood of identifying the single customer entity, and selecting electronic customer records with similar block keys including by choosing block keys having a higher likelihood of identifying the single customer entity over block keys having a lower likelihood of identifying the single customer entity, to define the target group of electronic customer records, such that each electronic customer record in the target group is more likely to be linked to another electronic customer record in the target group than to an electronic customer record that is not in the target group when a pairwise comparison is performed; and for each pair of customer records in the target group of electronic customer records, comparing a first customer record of the pair of customer records to a second customer record of the pair of customer records to determine if the pair of customer records are linked records, wherein the comparing comprises:

analyzing a first set of data values from first corresponding data fields from the pair of customer records to determine a first distance between the first set of data values, wherein the first distance numerically represents a number of edit steps to change alpha-numeric characters of a first data value in the first customer record to be identical to alpha-numeric characters of a second data value in the second customer record, analyzing a second set of data values from second corresponding data fields from the pair of customer records to determine a second distance between the second set of data values, combining the first distance and the second distance into a combined distance value representative of a distance between the pair of customer records by using a combination function that provides a maximum value cap and a weight for the first distance, and identifying the pair of customer records as linked records, and combining information from the first customer record and the second customer record to create a modified customer record in the at least one memory when the combined distance value is less than a predetermined maximum value.

2. The method of claim 1, wherein determining the first distance comprises using a first distance function, and wherein determining the second distance comprises using a second distance function different from the first distance function.

3. The method of claim 1, wherein the combined distance value is a sum of individual capped and weighted distance values corresponding to different data values in the pair of customer records, and wherein each of the individual capped and weighted distance values is the minimum of a distance function and a maximum distance value multiplied by a weighting term.

4. The method of claim 1, wherein analyzing a first set of data values from first corresponding data fields from the pair of records to determine a first distance between the first set of data values comprises:

using a distance function to analyze the first set of data values from first corresponding data fields from the pair of customer records and determine the first distance between the first set of data values, wherein the distance function is selected from the group consisting of: Levenshtein Distance, and a TriGraham Ratio.

5. The method of claim 1, analyzing a first set of data values from first corresponding data fields from the pair of customer records to determine a first distance between the first set of data values comprises:

using a comparison metric that analyzes a pair of corresponding alphanumeric data values from a first customer record and a second customer record in the pair of customer records to determine a degree of separation between the alphanumeric data values.

6. The method of claim 5, wherein the degree of separation is expressed as a distance.

7. The method of claim 1, wherein the first record comprises a first plurality of data fields having data values therein, and wherein the second record comprises a second plurality of data fields that correspond to the first plurality of data fields, the second plurality of data fields having data values therein, and wherein the method comprises:

analyzing corresponding data values from the first record and the second record to generate a plurality of distance values that correspond to data values in corresponding data fields in the first and second records; and combining the plurality of distance values into a combined distance value representative of a distance between the first customer record and the second customer record by using a combination function that, for each of the plurality of distance values, provides a maximum value cap for the distance value and a weight for the distance value.

8. The method of claim 1, wherein identifying the target group of electronic customer records comprises:

using the hierarchical combinatorial function to generate multiple block keys associated with the electronic customer records stored in the at least one memory;

creating multiple block key groups of electronic customer records, each block key group of electronic customer records comprising records that contain an identical block key; and identifying the electronic customer records in one of the multiple block key groups as the target group of electronic customer records.

9. The method of claim 1, further comprising:

for each pair of customer records in the target group of electronic customer records, applying fuzzy logic to identify the likelihood that the pair of customer records are associated with the single customer entity.

10. A computer system comprising:

a computer processor and memory operatively connected to the computer processor, the memory storing a records linking module programmed to:

receive a blocking rule that defines a plurality of block keys for an electronic customer record as a function of data found within the electronic customer record, the blocking rule comprising at least one hierarchical combinatorial function configured to maximize opportunity to identify linked customer records and minimize comparison of electronic customer records, each of the plurality of block keys being previously associated with a likelihood of identifying the single customer entity according to a relative uniqueness of the data;

identify, without performing a pairwise comparison of electronic customer records, a target group of electronic customer records, the target group being a subset of the electronic customer records stored in at least one memory in a computing system, each electronic customer record having data fields containing data pertaining to a customer, by:

applying the blocking rule to the data found within each electronic customer record to determine each of the plurality of block keys, arranging the plurality of block keys based on the likelihood of identifying the single customer entity, and selecting electronic customer records with similar block keys including by choosing block keys having a higher likelihood of identifying the single customer entity over block keys having a lower likelihood of identifying the single customer entity, to define the target group of electronic customer records, such that each electronic customer record in the target group is more likely to be linked to another electronic customer record in the target group than to an electronic customer record that is not in the target group when a pairwise comparison is performed;

for each pair of customer records in the target group of electronic customer records compare a first customer record of the pair of customer records to a second customer record of the pair of customer records to determine if the pair of customer records are linked records, wherein linked records comprise two or more electronic customer records that pertain to a single customer entity, wherein the computer system is programmed to:

analyze a first set of data values from first corresponding data fields from the pair of customer records to determine a first distance between the first set of data values, wherein the first distance numerically represents a number of edit steps to change alpha-numeric characters of a first data value in the first customer record to be identical to alpha-numeric characters of a second data value in the second customer record;

analyze a second set of data values from second corresponding data fields from the pair of customer records to determine a second distance between the second set of data values;

combine the first distance and the second distance into a combined distance value representative of a distance between the pair of customer records by using a combination function that provides a maximum value cap for the first distance and a weight for the first distance;

identify the pair of customer records as linked records; and combine information from the first customer record and the second customer record to create a modified customer record in the at least one memory when the combined distance value is less than a predetermined maximum value.

11. The system of claim 10, wherein the first distance is determined by using a first distance function and the second distance is determined by using a second distance function different than the first distance function.

12. The system of claim 10, wherein the combined distance value is a sum of individual capped and weighted distance values corresponding to different data values in the pair of customer records, and wherein each of the individual capped and weighted distance values is the minimum of a distance function and a maximum distance value multiplied by a weighting term.

13. The system of claim 10, wherein the computer system is programmed to:

use a distance function to analyze a first set of data values from first corresponding data fields from the pair of customer records and determine a first distance between the first set of data values, wherein the distance function is selected from the group consisting of Levenshtein Distance, and TriGraham Ratio.

14. The system of claim 10, wherein the computer system is programmed to:

use a comparison metric that analyzes a pair of corresponding alphanumeric data values from a first customer record and a second customer record in the pair of customer records to determine a degree of separation between the alphanumeric data values.

15. The system of claim 14, wherein the degree of separation is expressed as a distance.

16. The system of claim 10, wherein the first customer record comprises a first plurality of data fields having data values therein, and wherein the second customer record comprises a second plurality of data fields that correspond to the first plurality of data fields, the second plurality of data fields having data values therein;

and wherein the computer system is programmed to:

analyze corresponding data values from the first customer record and the second customer record to generate a plurality of distance values that correspond to data values in corresponding data fields in the first and second customer records; and combine the plurality of distance values into a combined distance value that is representative of a distance between the first customer record and the second customer record by using a combination function that, for each of the plurality of distance values, provides a maximum value cap for the distance value and a weight for the distance value.

17. The system of claim 10, wherein the computer system is programmed to:

use the hierarchical combinatorial function to generate multiple block keys associated with customer records in the target group of customer records;

create multiple block key groups of customer records, each block key group of customer records comprising records that contain an identical block key; and compare pairs of customer records from each of the multiple block key groups of customer records to determine if the pairs of customer records are linked records.

18. The system of claim 10, wherein the computer system is further programmed to apply fuzzy logic to identify the likelihood that the pair of customer records are associated with the single customer entity.

\* \* \* \* \*